United States Patent
Moon et al.

(10) Patent No.: US 7,580,097 B2
(45) Date of Patent: Aug. 25, 2009

(54) LIQUID CRYSTAL DISPLAY PANEL

(75) Inventors: Ji Hye Moon, Seoul (KR); Young Nam Yun, Gunpo-Si (KR); Soo Guy Rho, Suwon-si (KR); Myung Hi Lee, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 3 days.

(21) Appl. No.: 11/831,076

(22) Filed: Jul. 31, 2007

(65) Prior Publication Data

US 2007/0268433 A1 Nov. 22, 2007

(30) Foreign Application Priority Data

Aug. 1, 2006 (KR) ........................ 10-2006-0072542

(51) Int. Cl.
*G02F 1/1335* (2006.01)

(52) U.S. Cl. ........................ 349/113; 349/104; 349/106; 349/108; 349/109

(58) Field of Classification Search ................. 349/113, 349/104, 106, 108, 109
See application file for complete search history.

(56) References Cited

U.S. PATENT DOCUMENTS

2006/0139522 A1* 6/2006 Chang et al. ................ 349/114
2007/0019142 A1* 1/2007 Roh et al. ................... 349/138

FOREIGN PATENT DOCUMENTS

| JP | 2005-141196 | 6/2005 |
| KR | 1020050037685 A | 4/2005 |
| KR | 1020060034399 A | 4/2006 |

* cited by examiner

*Primary Examiner*—Frank G Font
*Assistant Examiner*—Jerry Blevins
(74) *Attorney, Agent, or Firm*—Haynes and Boone, LLP (57) ABSTRACT

An LCD panel is provided for improving reflection efficiency. The LCD panel includes a first substrate defining a plurality of unit pixels, each unit pixel comprising a red sub-pixel area, a green sub-pixel area, a blue sub-pixel area, and a white sub-pixel area; a second substrate defining a plurality of unit pixels, each unit pixel comprising a red sub-pixel area, a green sub-pixel area, a blue sub-pixel area, and a white sub-pixel area; a thin film transistor formed on the first substrate; a pixel electrode connected to the thin film transistor; a reflection electrode connected to the pixel electrode; red, green, and blue color filters formed in the red, green, and blue sub-pixel areas, respectively, of the second substrate; and a light hole formed in the first substrate exposing the white sub-pixel area of the second substrate and exposing at least a portion of a red sub-pixel area, a green sub-pixel area, or a blue sub-pixel area of the second substrate.

13 Claims, 9 Drawing Sheets

LIQUID CRYSTAL DISPLAY PANEL

CROSS REFERENCE TO RELATED APPLICATIONS

This application claims priority to Korean Patent Application No. 2006-72542 filed on Aug. 1, 2006 and all the benefits accruing therefrom under 35 U.S.C. §119, and the contents of which are herein incorporated by reference in its entirety.

BACKGROUND OF THE INVENTION

1. Field of the Invention

The present invention relates to a liquid crystal display ("LCD") panel and, in particular, to an improved LCD panel which is capable of improving reflection efficiency.

2. Description of the Related Art

An LCD device is a thin, flat display device which displays an image by adjusting light transmissivity of liquid crystal cells arranged in the form of a matrix.

The LCD device can be classified into a transmissive LCD device and a reflective LCD device. The transmissive LCD device uses a backlight unit as a light source, and displays a bright image even in a dark ambient environment. However, the transmissive LCD device consumes much power. The reflective LCD device has an advantage of low power consumption since the reflective LCD does not include the backlight unit. However, the reflective LCD can not be used in the dark ambient environment.

Accordingly, a transflective LCD device has been developed. Since the transflective LCD device includes both a reflective portion and a transmissive portion in a sub-pixel, the transflective LCD device is driven in a transmissive mode or a reflective mode, if necessary. However, since the transflective LCD device includes the reflective portion and the transmissive portion in the sub-pixel, transmissivty of the transflective LCD device is lower than that of the transmissive LCD device, and reflexibility of the transflective LCD device is lower than that of the reflective LCD device. In other words, brightness of the transflective LCD device is lower than that of the transmissive LCD device.

SUMMARY OF THE INVENTION

An LCD panel capable of improving reflection efficiency is provided.

In an exemplary embodiment of the present invention, a liquid crystal display (LCD) panel includes first and second substrates defining red, green, blue, and white sub-pixel areas, a thin film transistor formed on the first substrate, a pixel electrode connected to the thin film transistor, a reflection electrode connected to the pixel electrode, red, green, and blue color filters respectively formed in the red, green, and blue sub-pixel areas of the second substrate, and a light hole exposing a part of the second substrate in the red, green, and blue sub-pixel areas partially penetrating the red, green, and blue color filters and exposing the second substrate in the red, green, and blue sub-pixel areas.

In some embodiments, the light hole overlaps the reflection electrode.

In some embodiments, the red, green, blue, and white sub-pixel areas are arranged in row and column directions in the form of a two-dimensional array.

In some embodiments, respective light holes and respective reflection electrodes in red, green, blue, and white sub-pixel areas are arranged adjacent to one another in the form of a two-dimensional array.

In some embodiments, the red, green, blue and white sub-pixel areas are sequentially arranged in a row or column direction in the form of a stripe.

In some embodiments, respective light holes and respective reflection electrodes in the red, green, blue, and white sub-pixel areas are arranged adjacent to one another in the form of a stripe.

In some embodiments, the light hole of the white sub-pixel area is larger than the light hole of the green sub-pixel area, the light hole of the green sub-pixel is larger than the light hole of the red sub-pixel area, and the light hole of the red sub-pixel is larger than the light hole of the blue sub-pixel area.

In some embodiments, the light holes are formed so as to occupy 100% of the white sub-pixel area, 0~75% of the red sub-pixel area, 0~85% of the green sub-pixel area, and 0~50% of the blue sub-pixel area, in size.

In some embodiments, the reflection electrodes are formed so as to occupy 100% of the white sub-pixel area and 0~100% of each of the red, green, and blue sub-pixel areas.

In some embodiments, when the respective light holes and the respective reflection electrodes in the red, green, blue, and white sub-pixel areas are arranged adjacent to one another in the form of a stripe, sizes of the reflection electrodes in the red, green, and blue sub-pixel areas are the same as each other and a size of the reflection electrode in the white sub-pixel area is greater than a size of each of the reflection electrodes in the red, green, and blue sub-pixel areas.

BRIEF DESCRIPTION OF THE DRAWINGS

The above and other objects, features and advantages of the present invention will be more apparent from the following detailed description in conjunction with the accompanying drawings, in which.

DETAILED DESCRIPTION OF EXEMPLARY EMBODIMENTS

Exemplary embodiments of the present invention are described with reference to the accompanying drawings in detail. The same reference numbers will be used throughout the drawings to refer to the same or like parts. Detailed descriptions of well-known functions and structures incorporated herein are omitted to avoid obscuring the subject matter of the present invention.

Figure 1A:
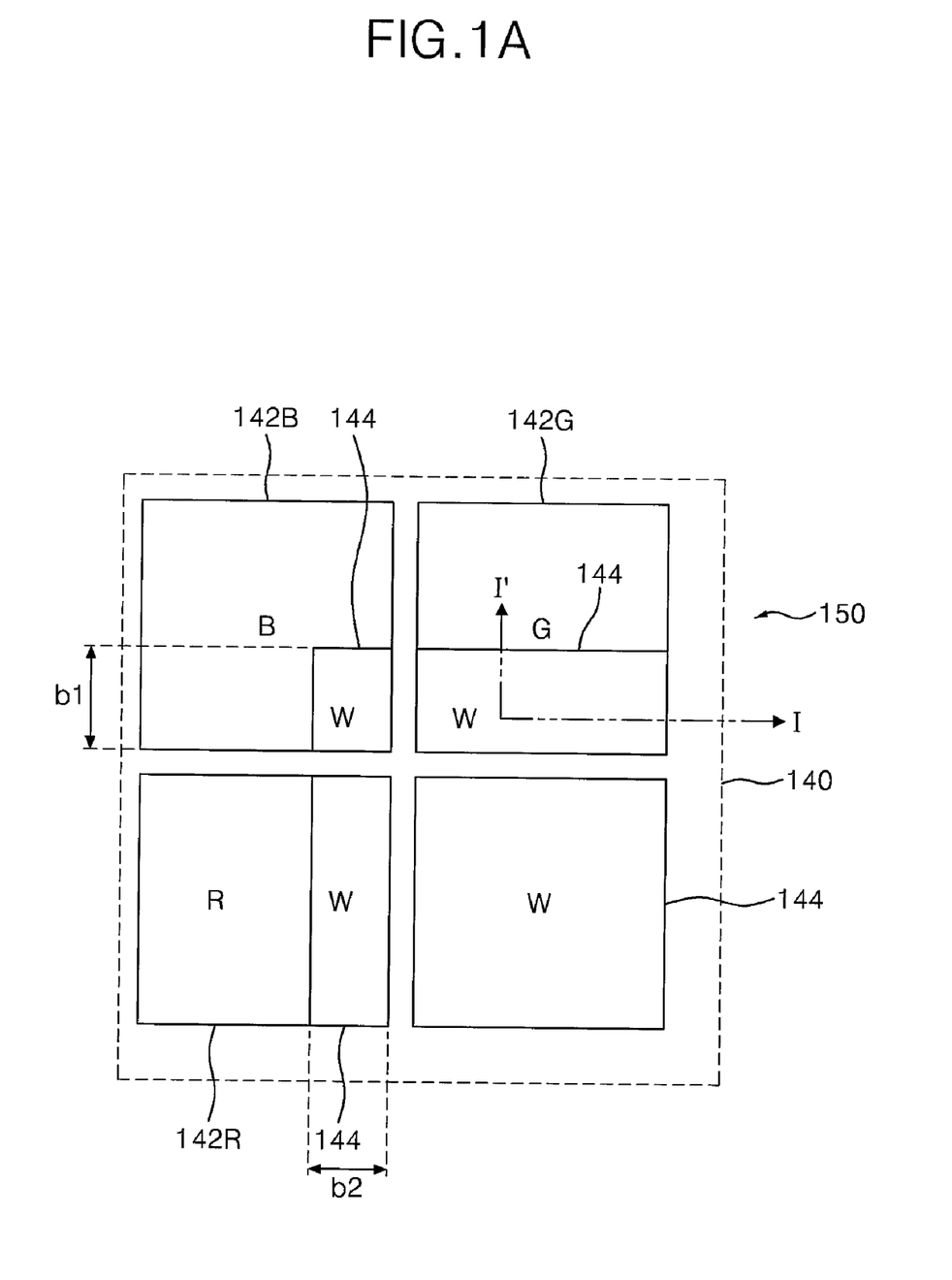
FIGS. 1A and 1B are plan views illustrating a color filter substrate and a thin film transistor (TFT) substrate of an LCD panel having sub-pixels arranged in the form of a two-dimensional array according to an exemplary embodiment of the present invention.
Figure 1B:
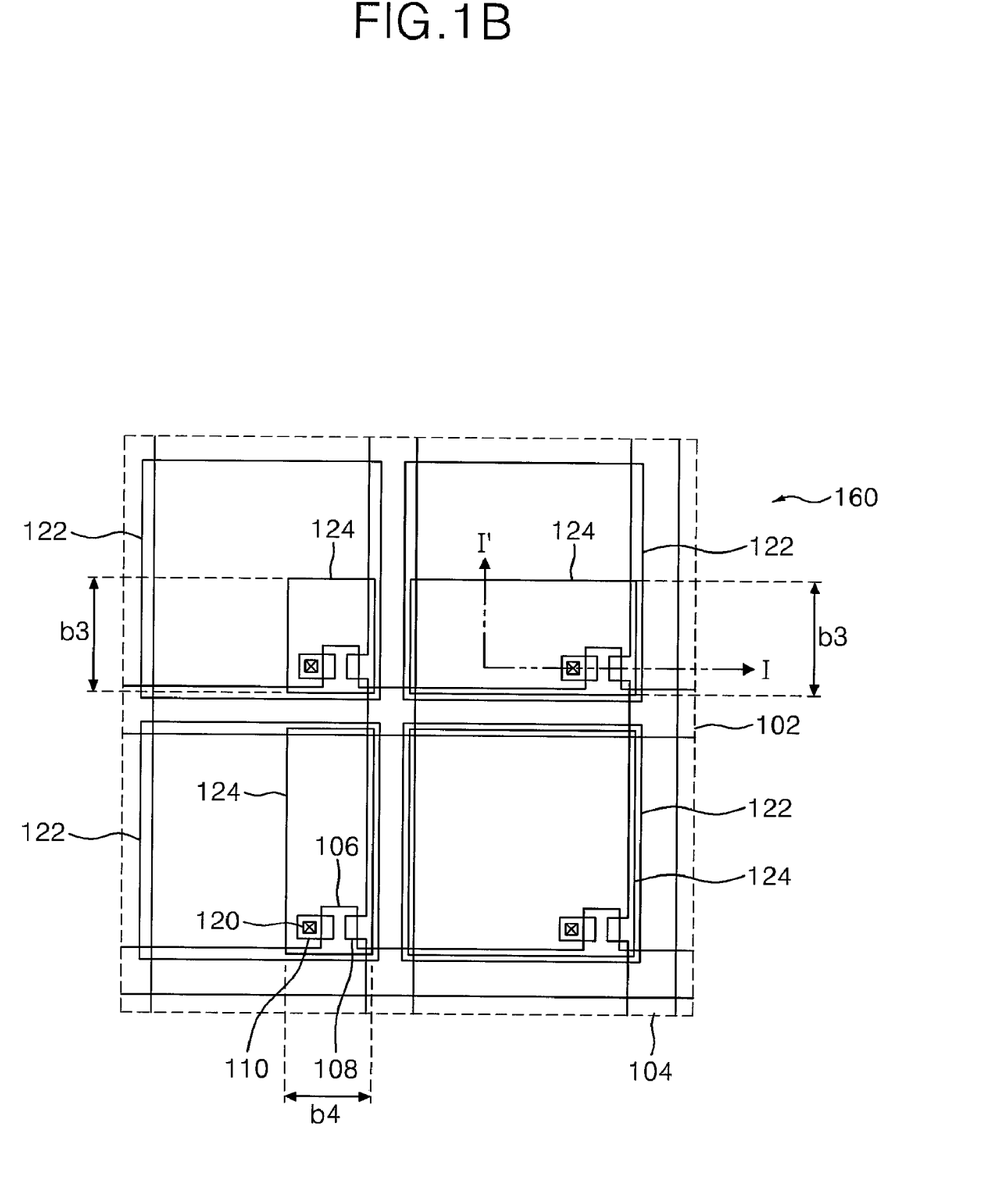
Figure 2A:
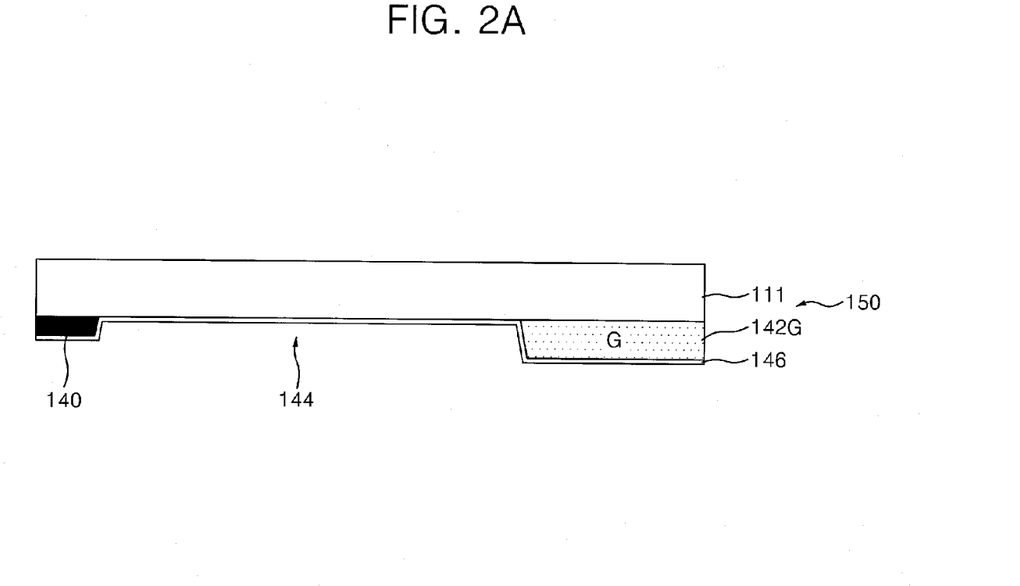
FIGS. 2A and 2B are cross-sectional views taken along line I-I' of FIGS. 1A and 1B.
Figure 2B:
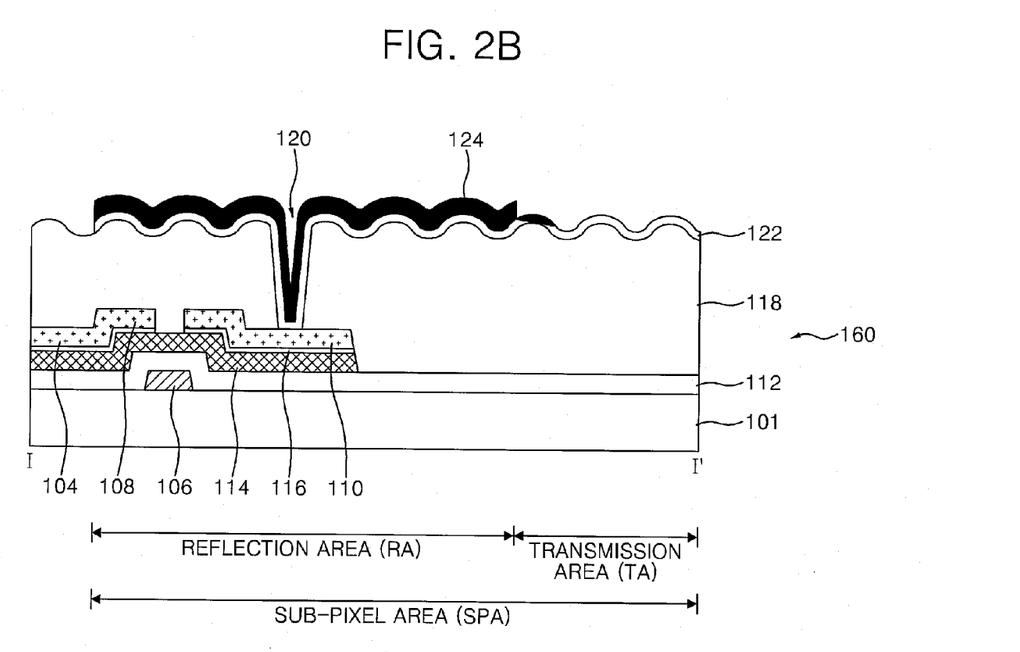

FIGS. 1A and 1B are plan views illustrating a color filter substrate and a thin film transistor (TFT) substrate of an LCD panel according to an exemplary embodiment of the present invention, and FIGS. 2A and 2B are cross-sectional views taken along line I-I' of FIGS. 1A and 1B.

Referring to FIGS. 1A, 1B, 2A, and 2B, the LCD panel comprises a TFT substrate 160 and a color filter substrate 150 positioned opposite each other with a liquid crystal layer interposed therebetween.

The LCD panel includes a plurality of unit pixels each comprising a red ("R"), a green ("G"), a blue ("B"), and a white ("W") sub-pixel arranged in a two-dimensional array. For example, a single unit pixel may be formed in a 2×2 matrix of four sub-pixels including an R, a G, a B, and a W sub-pixel.

The color filter substrate 150 includes a color filter array formed on an upper substrate 111. The color filter array includes a black matrix 140 for preventing light leakage, and color filters 142R, 143G, and 142B for displaying R, G, and B colors, respectively, a plurality of light holes 144, and a common electrode 146 for forming a vertical electric field with a pixel electrode 122 on the TFT substrate 160.

The black matrix 140 is formed on the upper substrate 111 so as to overlap the gate lines 102, data lines 104, and TFTs provided on the TFT substrate 160. The black matrix 104 defines sub-pixel areas (SPAs) and prevents optical interference between the adjacent sub-pixels. The common electrode 146 is formed on the upper substrate 111 so as to supply a common voltage to the liquid crystal cells.

The R, G, and B color filters 142R, 142G, and 142B are formed on the upper substrate 111 in corresponding sub-pixel areas except for a W sub-pixel area. In the W sub-pixel area, an opening, called a light hole 144, is formed without any color filters.

The R, G, and B color filters 142R, 142G, and 142B have respective light holes 144 in reflection areas (RAs) of the respective sub-pixel areas, resulting in exposure of the upper substrate 111 through the light holes 144.

The light holes 144 of the R, G, B and W sub-pixels constituting each unit pixel are adjacent to one another in the form of a two-dimensional array.

The size of the light hole 144 of each sub-pixel may be modified in consideration of a color temperature or white balance of the sub-pixel area.

More specifically, the sizes of the light holes 144 in each of the R, G, and B sub-pixel areas may be provided such that the W sub-pixel area is larger than the G sub-pixel area, which is larger than the R sub-pixel area, which is larger than the B sub-pixel area (i.e., W sub-pixel area>G sub-pixel area>R sub-pixel area>B sub-pixel area). For example, the light hole of the B sub-pixel area is formed so as to be smaller than that of the G sub-pixel area since the emission brightness of the blue light is less than that of the green light. The sizes of the light holes are determined by adjusting widths b1 and b2 (see FIG. 1A). That is, the first width b1 of the G sub-pixel area may be adjusted such that the light hole 144 occupies 0~85% of the G sub-pixel area. The second width b2 of the R sub-pixel area may be adjusted such that the light hole 144 occupies 0~75% of the R sub-pixel area. Also, the first width b1 and the second width b2 of the B sub-pixel area may be adjusted such that the light hole 144 occupies 0~50% of the blue B sub-pixel region. The white balance is obtained by modifying the emission brightness of the R, G, and B sub-pixels in this manner.

The TFT substrate 160 includes a TFT connected to the gate line 102 and the data line 104, a pixel electrode 122 formed in a transmission area (TA) of the sub-pixel area and connected to the TFT, and a reflection electrode 124 formed in a reflection area (RA) of the sub-pixel area.

The TFT selectively supplies a data signal input through the data line 104 to the pixel electrode 122 in response to a gate signal input through the gate line 102. The TFT includes a gate electrode 106 connected to the gate line 102, a source electrode 108 connected to the data line 104, a drain electrode 110 connected to the pixel electrode 122 through a contact hole 120 penetrating an organic protection layer 118, an active layer 114 for forming a channel between the source and drain electrodes 108 and 110 while overlapping the gate electrode 106 with a gate dielectric layer 112 disposed between the active layer 114 and the gate electrode 106, and an ohmic contact layer 116 for providing ohmic contact between the active layer 114 and the source and drain electrodes 108 and 110.

The gate electrode 106 is formed on a lower substrate 101 together with the gate line 102 and then the active layer 114 and the ohmic contact layer 116 are deposited on the gate dielectric layer 112. Next, the source and drain electrodes 108 and 110 are formed on the ohmic contact layer 116 together with the data line 104. The TFT is connected to the pixel electrode 122 and the reflection electrode 124 through the contact hole 120 penetrating the organic protection layer 118 formed over the TFT. Accordingly, the TFT supplies the data signal from the data line 104 to the pixel electrode 122 and to the reflection electrode 124 in response to the gate signal from the gate line 102. An inorganic protection layer may be additionally formed on an upper and/or lower surface of the organic protection layer 118.

The pixel electrode 122 is connected to the drain electrode 110 through the contact hole 120 formed in the sub-pixel area. The pixel electrode 122 is made of a transparent conductive material so as to pass the light emitted from the backlight unit. The data signal from the TFT is applied to the pixel electrode 122 such that a voltage difference is generated between the pixel electrode 122 and the common electrode 146. Due to the voltage difference, liquid crystal molecules are twisted so that the light transmittance is determined by the degree of twist of the liquid crystal molecules in the reflection area and the transmission area.

The reflection electrode 124 is formed in the reflection area of the sub-pixel area and is connected to the drain electrode 110 through the pixel electrode 122. An area in which the reflection electrode 124 is formed is defined as the reflection area, and the other area of the sub-pixel area in which the reflection electrode 124 is not formed is defined as the transmission area. The reflection electrode 124 is made of a conductive material having a high reflectivity so as to reflect incident light from outside toward the color filter substrate 150. In order to increase the reflectivity, the organic protection layer 118 is formed having an embossed surface such that the reflection electrode 124 has an identical embossed surface.

The reflection electrode 124 may be formed so as to overlap the light hole 144 of the sub-pixel area. The reflection electrodes 124 for the respective R, G, B, and W sub-pixels are arranged so as to be adjacent to each other in the form of a two-dimensional array.

At least one of the reflection electrodes for the R, G, B, and W sub-pixels is formed in different size than the other reflection electrodes.

More specifically, the reflection electrode 124 of the W sub-pixel area is formed with an area substantially identical to the area of the light hole 144 of the W sub-pixel area such that the entire W sub-pixel area is covered by the reflection electrode 124.

With the W sub-pixel area, the reflection area occupies at least ¼ of the unit pixel in size so that the reflectivity increases in a transflective mode. Also, it may be more advantageous from a manufacturing perspective to form the organic protection layer 118 in the W sub-pixel area comprising the reflection area than to form the organic protective layer in a relatively narrow reflection area of the sub-pixel area.

The reflection electrode 124 of the G sub-pixel area is formed adjacent to the reflection electrode 124 of the W sub-pixel area by interposing the gate line 102. The reflection electrode 124 of the G sub-pixel is formed with a width b3 (see FIG. 1B).

The reflection electrode 124 of the R sub-pixel area on the left of the W sub-pixel area is formed adjacent to the reflection electrode 124 of the W sub-pixel area by interposing the data line 104. The reflection electrode 124 of the R sub-pixel area is formed with a width b4 (see FIG. 1B).

The reflection electrode 124 of the B sub-pixel area positioned in a diagonal direction from the W sub-pixel area is defined by the widths b3 and b4.

The widths b3 and b4 may be adjusted depending on the LCD utilization environment.

More specifically, the widths b3 and b4 may be adjusted so as to be suitable for a reflective mode in an ambient light environment of high brightness, for a transflective mode in an ambient light environment of low brightness, or for a transmissive mode in a dark ambient environment.

That is, the widths b3 and b4 may be selected such that the reflection electrode 124 occupies 100% of the W sub-pixel area and occupies the R, G, and B sub-pixel areas in the range of 0~100%.

For example, if the reflection electrode 124 is formed so as to occupy 100% of the W sub-pixel area and 0% of the respective R, G, and B sub-pixel areas, in a reflective mode, only the W sub-pixel area is driven, and an achromatic color images is displayed. In this case, the LCD panel may be applicable to a text mode of an external window of cell phones.

The incident light incoming through the W sub-pixel area passes the liquid crystal layer and reflects from the reflection electrode 124 of the W sub-pixel area to the outside through the liquid crystal layer. The light emitted from the backlight unit passes the liquid crystal layer and the R, G, and B color filters.

If the reflection electrodes 124 occupy 100% of the respective W, R, G, and B sub-pixel areas, the LCD panel is implemented as a reflective mode. In this case, the incident light passing through the R, G, B, and W sub-pixel areas and the liquid crystal layer is reflected from the reflection electrodes 124.

Figure 3A:
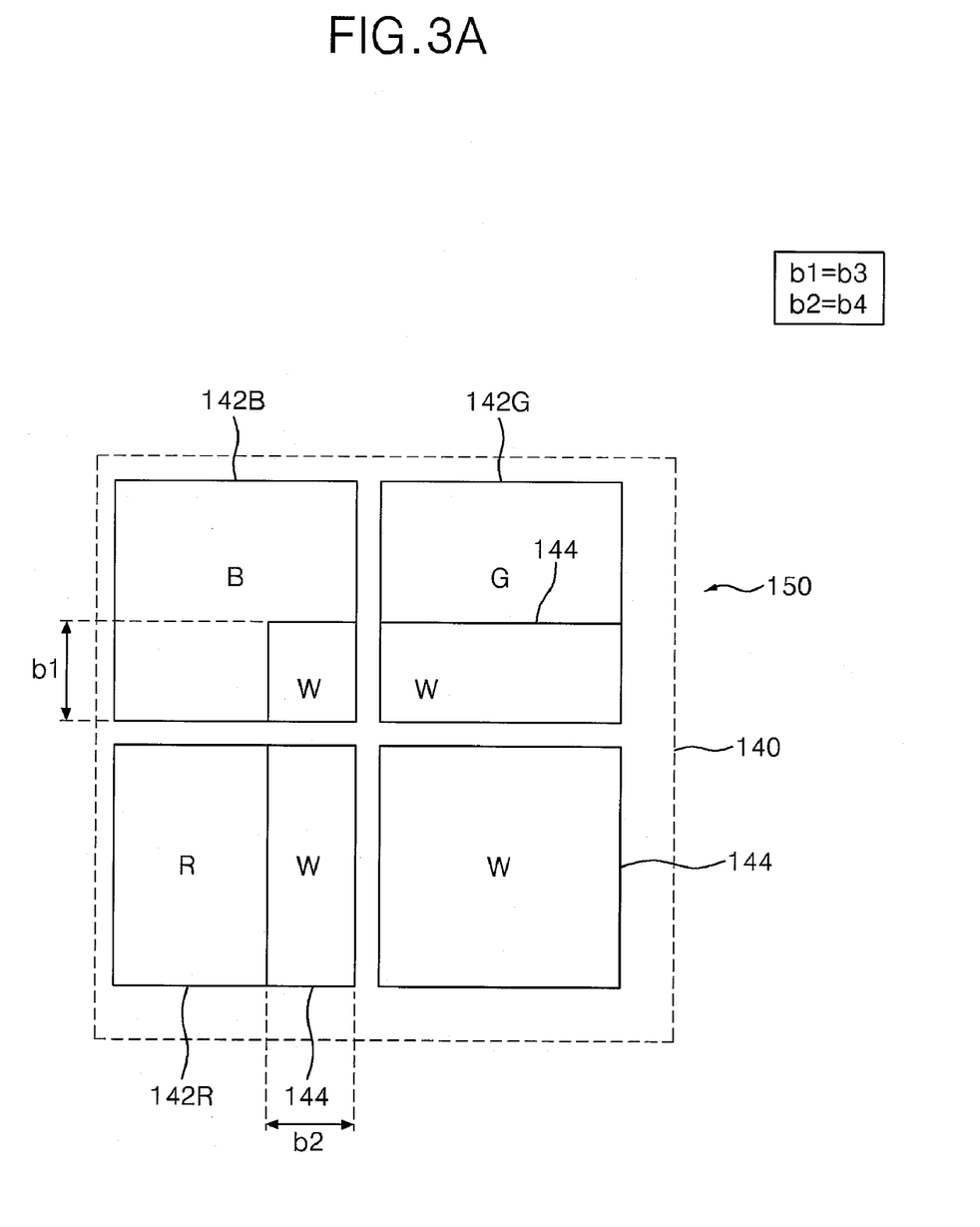
FIGS. 3A and 3B are plan views illustrating a color filter substrate and a TFT substrate of an LCD panel having sub-pixels arranged in the form of a two-dimensional array according to another exemplary embodiment of the present invention.
Figure 3B:
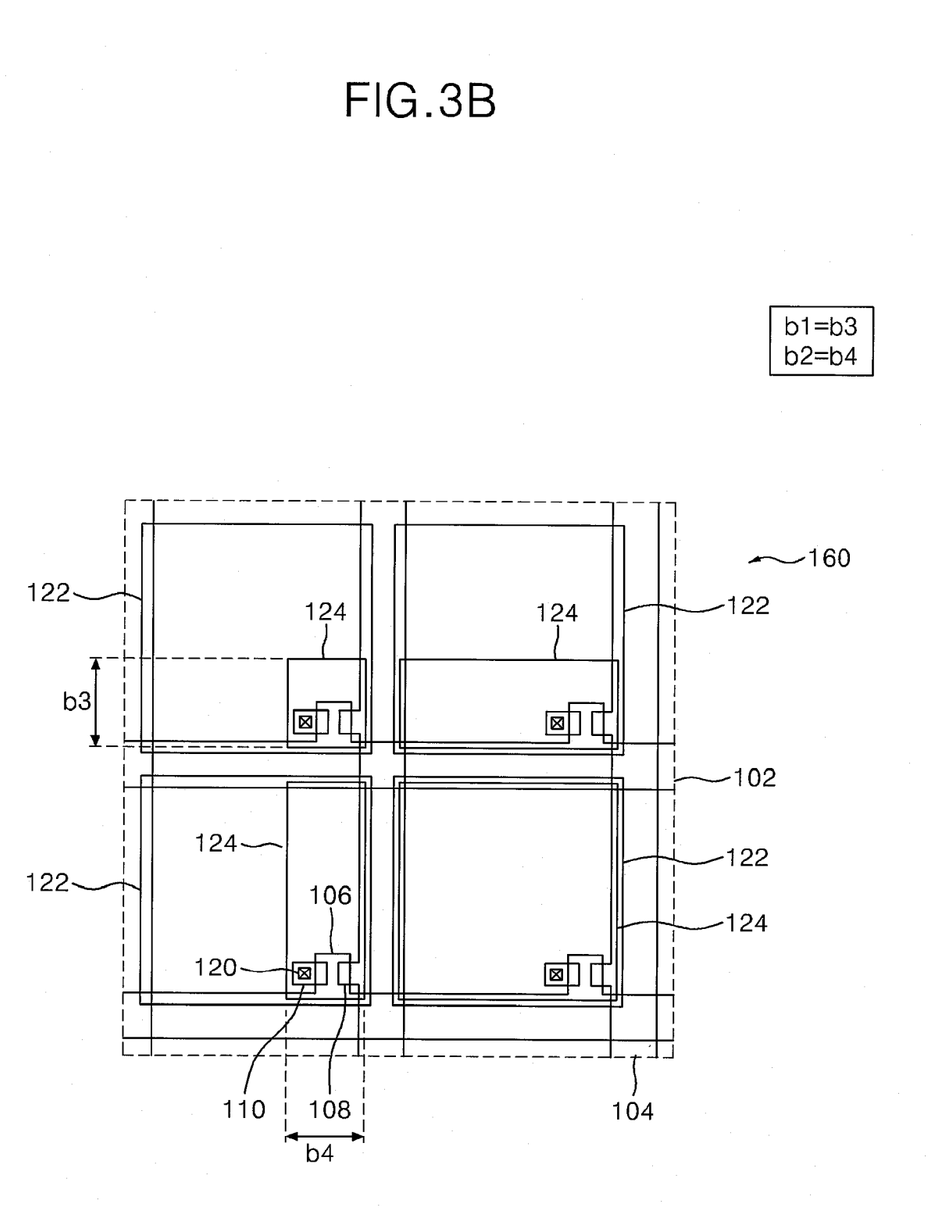

FIGS. 3A and 3B are plan views illustrating a color filter substrate and a TFT substrate of an LCD panel having sub-pixels arranged in the form of a two-dimensional array according to another exemplary embodiment of the present invention.

Referring to FIGS. 3A and 3B, the first width b1 is equal to the third width b3 and the second width b2 is equal to the fourth width b4. In this case, the incident light is reflected from the reflection electrodes through the light holes 144 and the light generated by the backlight unit is emitted through the color filters 142R, 142G, and 142B. Accordingly, in the transmission areas of the R, G, and B sub-pixel areas, chromatic and achromatic color images are implemented. In the reflection areas of the R, G and B sub-pixel areas and W sub-pixel area, an achromatic image is implemented. Alternatively, when the widths b1, b2, b3 and b4 are equal to 0, since the reflection area doesn't exist, in the transmission areas of the R, G, and B sub-pixel areas, chromatic and achromatic color images are implemented and in the W sub-pixel area, an achromatic image is implemented.

As described above, the LCD panel according to the first embodiment of the present invention comprises unit pixels, with each unit pixel including a W sub-pixel wholly occupied by a reflection area, and the R, G, and B sub-pixels occupied by at least one of the transmission area and the reflection area. The LCD panel according to the first embodiment of the present invention can improve the reflection efficiency in the reflective mode, since at least ¼ of a unit pixel is occupied by the reflection area in size.

Figure 4A:
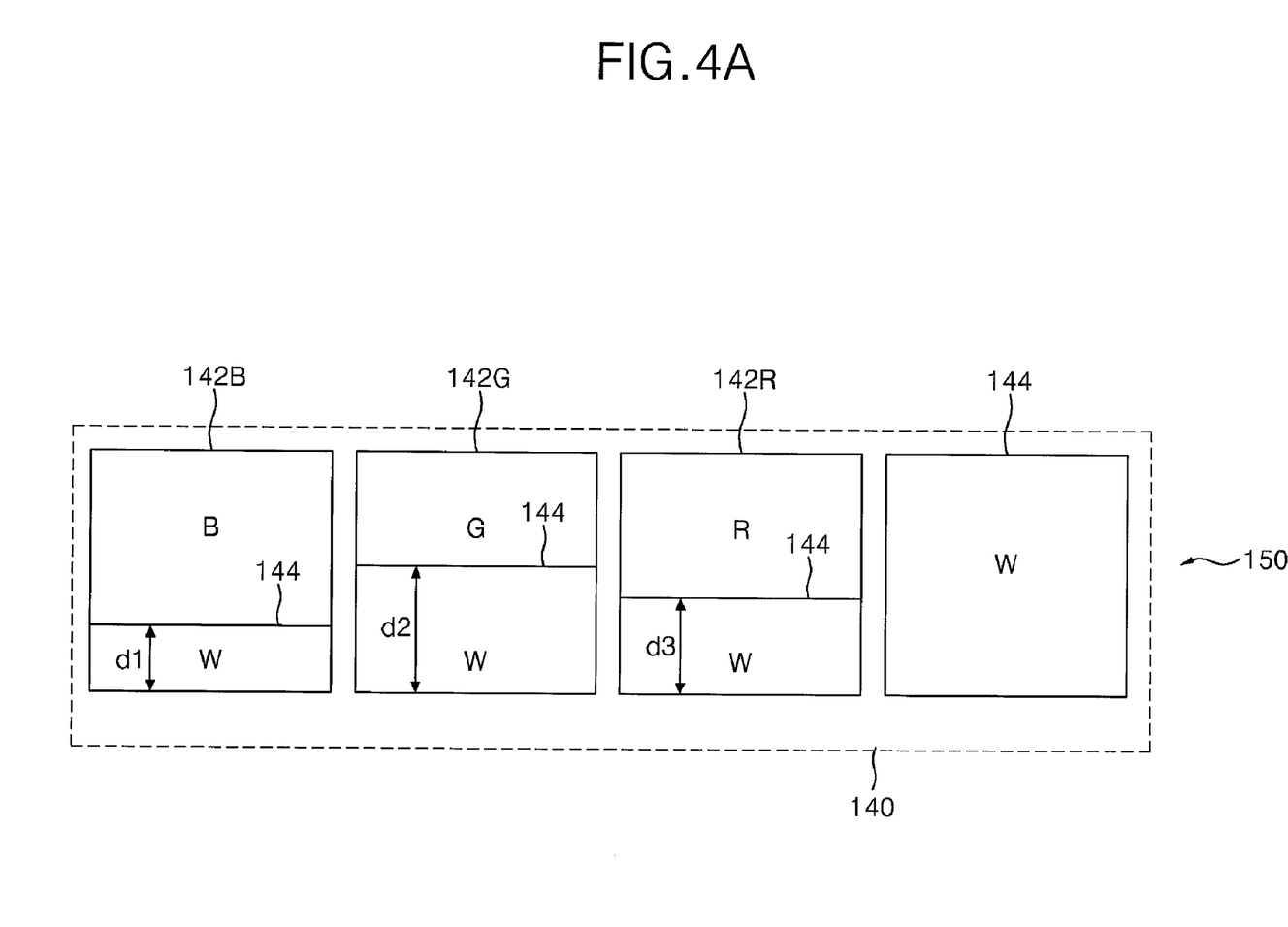
FIGS. 4A and 4B are plan views illustrating a color filter substrate and a TFT substrate of an LCD panel having sub-pixels arranged in the form of a stripe according to an exemplary embodiment of the present invention.
Figure 4B:
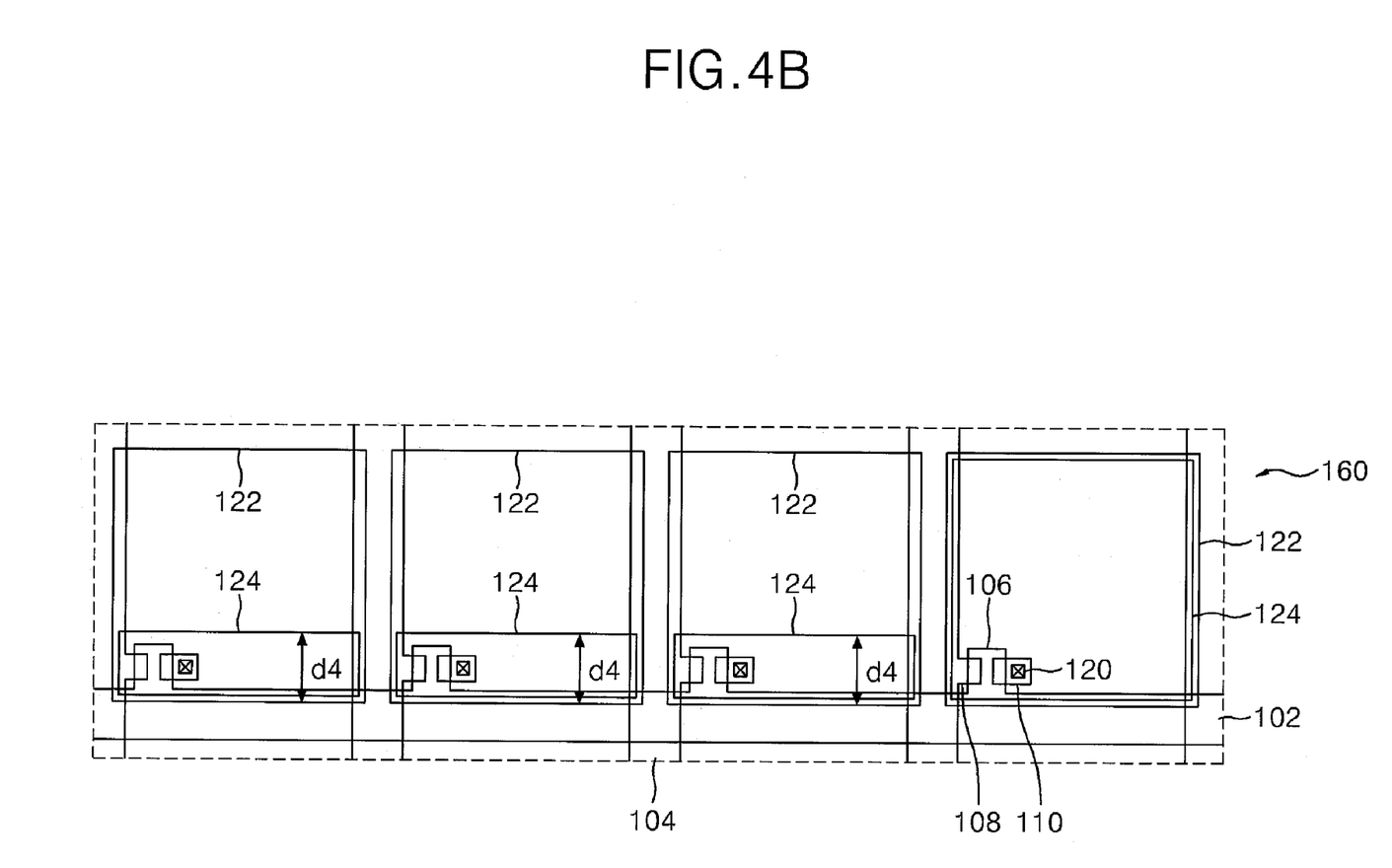

FIGS. 4A and 4B are plan views illustrating a color filter substrate and a TFT substrate of an LCD panel according to another exemplary embodiment of the present invention.

The LCD panel of FIGS. 4A and 4B is substantially identical to the LCD panel of FIGS. 3A and 3*b* except that the R, G, B, and W sub-pixels are linearly arranged in rows or columns. Accordingly, the structures and functions of the identical elements are not described.

Referring to FIGS. 4A and 4B, light holes 144 are formed to partially penetrate the color filters 142B, 142G, and 142R in the reflection areas of the sub-pixel areas such that the upper substrate 111 is exposed through the light holes 144. The light hole 144 is also formed so as to expose the upper substrate 111 in the reflection area of the sub-pixel area. The light holes of the R, G, B, and W sub-pixels constituting the unit pixel are linearly arranged in rows and columns. The sizes of the light holes 144 may be adjusted in consideration of the color temperature of the sub-pixel areas and the white balance.

More specifically, the light hole of the B sub-pixel area is formed so as to be smaller than that of the G sub-pixel area since the emission brightness of the blue light is less than that of the green light. The sizes of the light holes are determined by adjusting the widths d1, d2, and d3.

For example, the first width d1 is adjusted such that the light hole 144 occupies 0~50% of the B sub-pixel area, the second width d2 is adjusted such that the light hole 144 occupies 0~85% of the G sub-pixel area, and the third width d3 is adjusted such that the light hole 144 occupies 0~75% of the R sub-pixel area. In this manner, the brightness of the R, G, and B sub-pixels can be made similar to one another so that the white balance can be obtained.

The reflection electrodes 124 are formed on the organic protection layer having an embossed surface facing the light holes 144.

The reflection electrodes 124 for the R, G, B, and W sub-pixels are formed at the portions corresponding to the respective light holes.

Sizes of the reflection electrodes 124 in the R, G, and B sub-pixels are the same as each other and a size of the reflection electrode 124 in the W sub-pixel is greater than a size of each of the reflection electrodes 124 in the R, G, and B sub-pixels.

More specifically, the reflection electrode 124 of the W sub-pixel area has an identical size with the light hole 144 of the W sub-pixel area such that the whole sub-pixel area is covered by the reflection electrode 124. With the W sub-pixel area, the reflection area occupies at least ¼ of the unit pixel in size so that the reflectivity increases in a transflective mode.

The fourth width d4 is adjusted such that the reflection electrodes 124 occupies 0~100% of the respective R, G, and B sub-pixel areas. The fourth width d4 may be adjusted in accordance with the LCD panel utilization environment.

More specifically, the fourth width d4 is adjusted so as to be suitable for a reflective mode in an ambient light environment of high brightness, for a transflective mode in an ambient light environment of low brightness, and for a transmissive mode in a dark ambient environment.

Figure 5A:
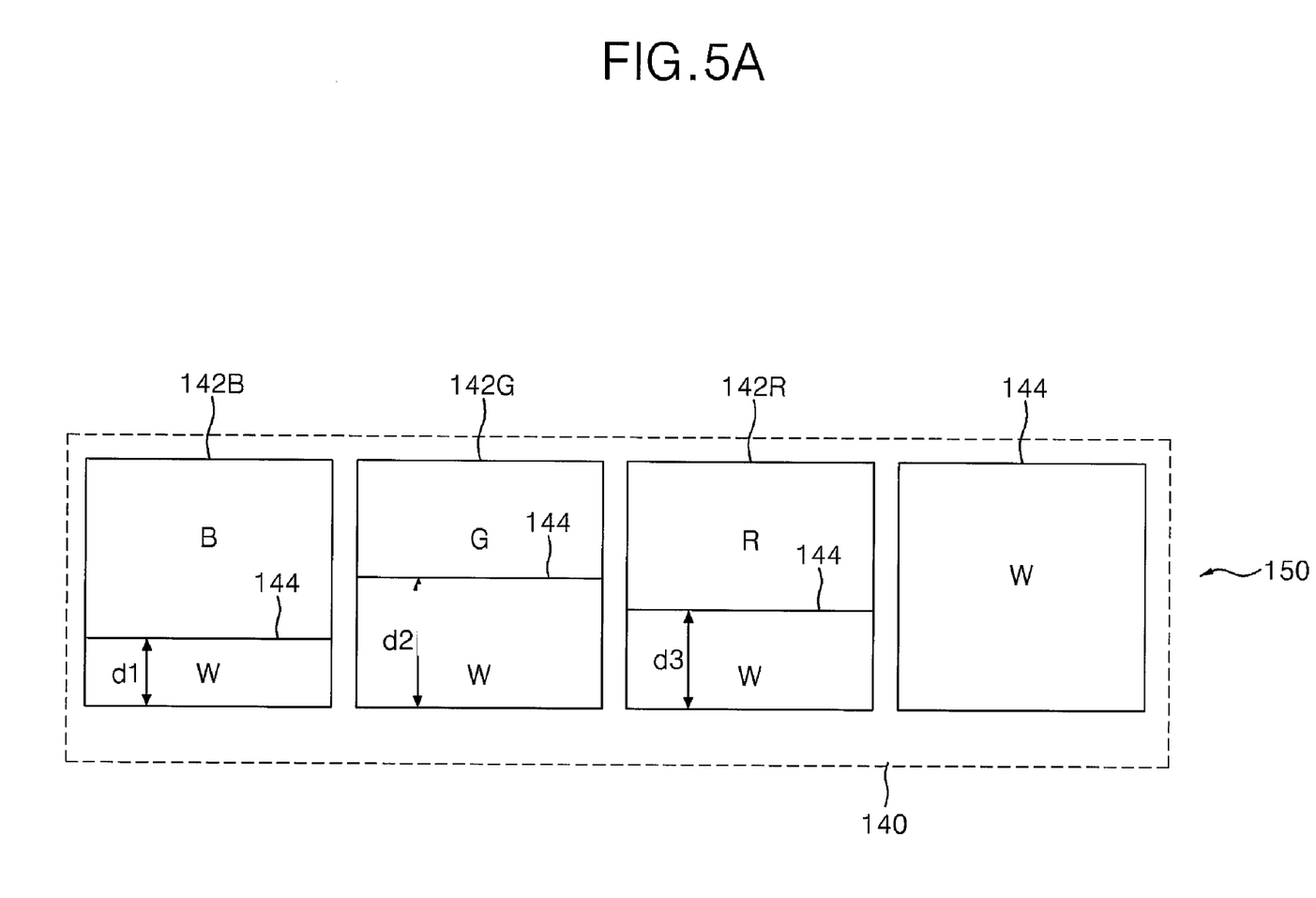
FIGS. 5A and 5B are plan views illustrating a color filter substrate and a TFT substrate of an LCD panel having sub-pixels arranged in the form of a stripe according another exemplary embodiment of the present invention.
Figure 5B:
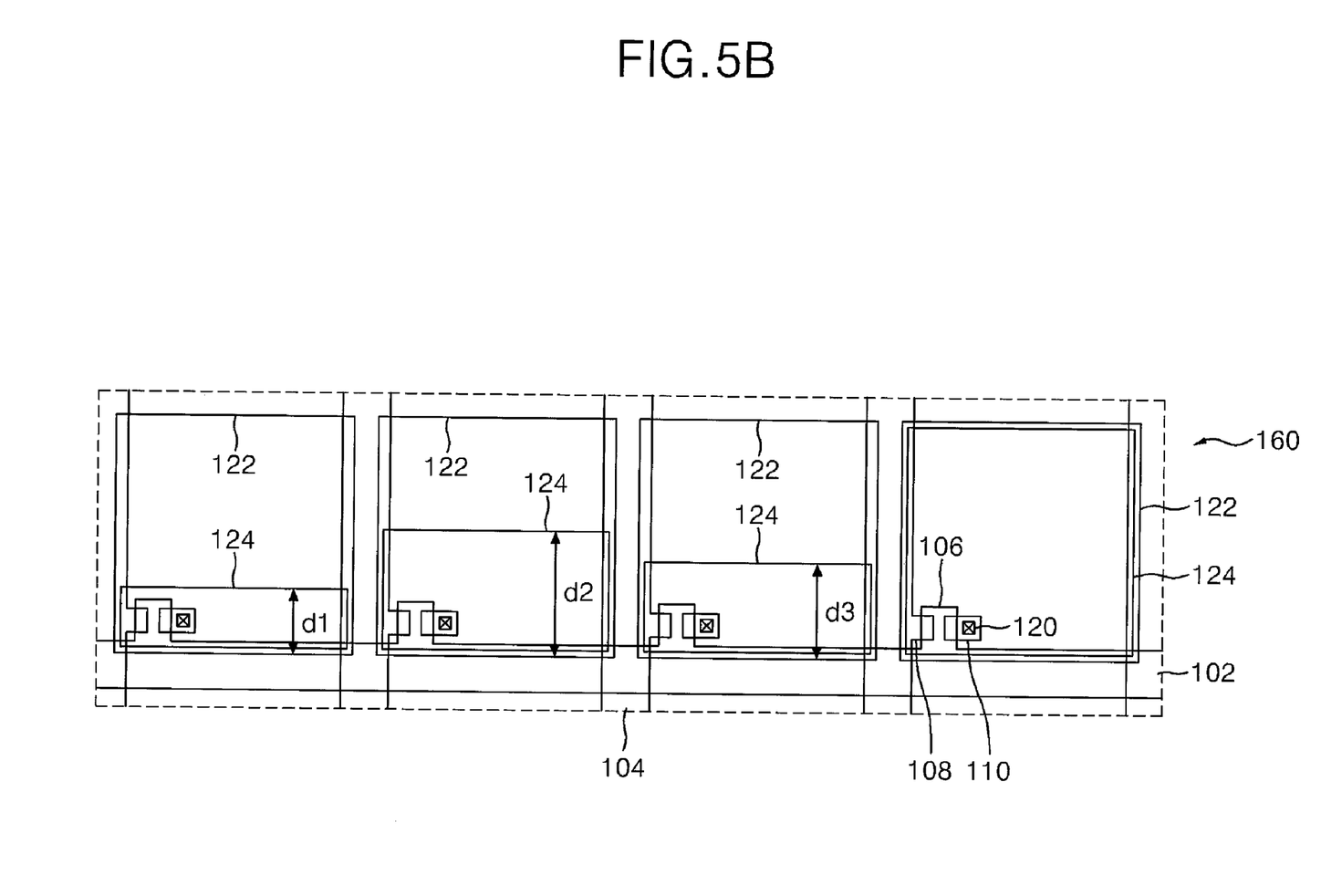

FIGS. 5A and 5B are plan views illustrating a color filter substrate and a TFT substrate of an LCD panel according to another exemplary embodiment of the present invention.

Referring to FIGS. 5A and 5B, the sizes of the reflection electrodes 124 of the sub-pixel areas are identical with those of the corresponding light holes 144. In this case, the incident light is reflected from the reflection electrodes 124 exposed through the light holes 144 and the light generated by the backlight unit is emitted through the color filters 142R, 142G, and 142B. Accordingly, in the transmission areas of the R, G, and B sub-pixel areas, chromatic and achromatic color images are implemented. In the reflection areas of the R, G, and B sub-pixel areas and W sub-pixel area, an achromatic image is implemented. Alternatively, when the widths d1, d2 and d3 are equal to 0, since the reflection area doesn't exist, in the transmission areas of the R, G, and B sub-pixel areas, chromatic and achromatic color images are implemented and in the W sub-pixel area, an achromatic image is implemented. As described above, the LCD panel according to the second embodiment of the present invention comprises unit pixels, with each unit pixel including a W sub-pixel wholly occupied by a reflection area, and the R, G, and B sub-pixels occupied by at least one of the transmission area and the reflection area. The LCD panel according to the second embodiment of the present invention can improve the reflection efficiency in the reflective mode, since at least ¼ of a unit pixel is occupied by the reflection area in size.

In the above described embodiments, although the sub-pixels are arranged in the form of a two-dimensional array or a linear stripe, the present invention is not limited thereto, but the arrangement of the sub-pixels can be modified according to the type of the LCD panel and may be arranged in different ways.

As described above, the LCD panel of the present invention includes a W sub-pixel implemented as a reflection area and R, G, and B sub-pixels each having at least one of a transmission area and a reflection area whereby The LCD panel of the present invention is implemented such that at least ¼ of a unit pixel is occupied by a reflection area, resulting in improvement of light reflection efficiency in a reflective mode.

Although exemplary embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A liquid crystal display panel comprising:
   a first substrate defining a plurality of unit pixels, each unit pixel comprising a red sub-pixel area, a green sub-pixel area, a blue sub-pixel area, and a white sub-pixel area;
   a second substrate defining a plurality of unit pixels, each unit pixel comprising a red sub-pixel area, a green sub-pixel area, a blue sub-pixel area, and a white sub-pixel area;
   a thin film transistor formed on the first substrate;
   a pixel electrode connected to the thin film transistor;
   a reflection electrode connected to the pixel electrode;
   red, green, and blue color filters formed in the red, green, and blue sub-pixel areas, respectively, of the second substrate; and
   a light hole formed in the second substrate exposing the white sub-pixel area of the second substrate and exposing at least a portion of a red sub-pixel area, a green sub-pixel area, or a blue sub-pixel area of the second substrate,
   wherein the reflection electrode is formed so as to occupy 100% of the white sub-pixel area.

2. The liquid crystal display panel of claim 1, wherein the light hole overlaps the reflection electrode.

3. The liquid crystal display panel of claim 1, wherein the red, green, blue, and white sub-pixel areas are arranged in row and column directions in a two-dimensional array.

4. The liquid crystal display panel of claim 3, wherein the respective light holes and respective reflection electrodes in the red, green, blue, and white sub-pixel areas are arranged adjacent to one another in the form of a two-dimensional array.

5. The liquid crystal display panel of claim 4, wherein the reflection electrodes are formed so as to occupy 100% of the white sub-pixel area and 0~100% of each of the red, green, and blue sub-pixel areas.

6. The liquid crystal display panel of claim 4, wherein the light hole of the white sub-pixel area is larger than the light hole of the green sub-pixel area, the light hole of the green sub-pixel is larger than the light hole of the red sub-pixel area, and the light hole of the red sub-pixel is larger than the light hole of the blue sub-pixel area.

7. The liquid crystal display panel of claim 6, wherein the light holes are formed so as to occupy 100% of the white sub-pixel area, 0~75% of the red sub-pixel area, 0~85% of the green sub-pixel area, and 0~50% of the blue sub-pixel area, in size.

8. The liquid crystal display panel of claim 1, wherein the red, green, blue and white sub-pixel areas are sequentially arranged in a row or column direction in the form of a stripe.

9. The liquid crystal display panel of claim 8, wherein respective light holes and reflection electrodes in the red, green, blue, and white sub-pixel areas are arranged adjacent to one another in the form of a stripe.

10. The liquid crystal display panel of claim 9, wherein the light hole of the white sub-pixel area is larger than the light hole of the green sub-pixel area, the light hole of the green sub-pixel is larger than the light hole of the red sub-pixel area, and the light hole of the red sub-pixel is larger than the light hole of the blue sub-pixel area.

11. The liquid crystal display panel of claim 10, wherein the light holes are formed so as to occupy 100% of the white sub-pixel area, 0~75% of the red sub-pixel area, 0~85% of the green sub-pixel area, and 0~50% of the blue sub-pixel area, in size.

12. The liquid crystal display panel of claim 6, wherein the reflection electrodes are formed so as to occupy 100% of the white sub-pixel area and 0~100% of each of the red, green, and blue sub-pixel areas.

13. The liquid crystal display panel of claim 12, wherein sizes of the reflection electrodes in the red, green, and blue sub-pixel areas are the same as each other and a size of the reflection electrode in the white sub-pixel area is greater than a size of each of the reflection electrodes in the red, green, and blue sub-pixel areas.

* * * * *